(12) United States Patent
Latif

(10) Patent No.: US 8,082,099 B2
(45) Date of Patent: Dec. 20, 2011

(54) AIRCRAFT NAVIGATION USING THE GLOBAL POSITIONING SYSTEM AND AN ATTITUDE AND HEADING REFERENCE SYSTEM

(75) Inventor: Shehzad Latif, Redmond, WA (US)

(73) Assignee: Universal Avionics Systems Corporation, Tucson, AZ (US)

( * ) Notice: Subject to any disclaimer, the term of this patent is extended or adjusted under 35 U.S.C. 154(b) by 471 days.

(21) Appl. No.: 12/351,243

(22) Filed: Jan. 9, 2009

(65) Prior Publication Data

US 2010/0179758 A1    Jul. 15, 2010

(51) Int. Cl.
     *G01C 21/16*      (2006.01)

(52) U.S. Cl. ........................ 701/216; 701/220

(58) Field of Classification Search .................. 701/200, 701/207, 208, 214, 216, 213, 215; 348/142
See application file for complete search history.

(56) References Cited

U.S. PATENT DOCUMENTS

| | | | |
|---|---|---|---|
| 4,930,085 A | | 5/1990 | Kleinschmidt |
| 5,216,611 A | | 6/1993 | McElreath |
| 5,375,059 A | * | 12/1994 | Kyrtsos et al. ................. 701/215 |
| 5,512,903 A | * | 4/1996 | Schmidtke ............... 342/357.31 |
| 5,617,317 A | | 4/1997 | Ignagni |
| 5,631,656 A | | 5/1997 | Hartman et al. |
| 5,672,872 A | | 9/1997 | Wu et al. |
| 5,760,737 A | | 6/1998 | Brenner |
| 6,145,378 A | * | 11/2000 | McRobbie et al. .............. 73/490 |
| 6,694,260 B1 | * | 2/2004 | Rekow ........................... 701/214 |
| 6,697,736 B2 | | 2/2004 | Lin |
| 7,107,833 B2 | * | 9/2006 | Osborne ..................... 73/178 R |
| 7,248,964 B2 | * | 7/2007 | Bye ................................ 701/200 |
| 7,400,956 B1 | * | 7/2008 | Feller et al. ..................... 701/41 |
| 7,409,290 B2 | | 8/2008 | Lin |
| 7,805,241 B2 | * | 9/2010 | Sato .............................. 701/208 |
| 2002/0158796 A1 | * | 10/2002 | Humphrey et al. ....... 342/357.14 |
| 2003/0149528 A1 | * | 8/2003 | Lin ................................ 701/214 |
| 2005/0007450 A1 | * | 1/2005 | Hill et al. ....................... 348/142 |
| 2006/0287824 A1 | * | 12/2006 | Lin ................................ 701/214 |
| 2007/0234933 A1 | * | 10/2007 | Donnell et al. ............... 108/56.3 |
| 2008/0167770 A1 | * | 7/2008 | Macdonald et al. ............ 701/24 |

(Continued)

OTHER PUBLICATIONS

Schlee, F.H., et al., Use of an External Cascade Kalman Filter to Improve the Performance of a Global Positioning System (GPS) Inertial Navigator, IEEE Proceedings National Aerospace and Electronics Conference, Abstract, May 23-27, 1988, Ohio.

(Continued)

*Primary Examiner* — Thomas Black
*Assistant Examiner* — Marthe Marc-Coleman
(74) *Attorney, Agent, or Firm* — Quarles & Brady LLP; George E. Haas

(57) ABSTRACT

A vehicle navigation technique uses a receiver for signals of a global positioning system to produce a first position indication and a first velocity indication. An attitude and heading reference system employs accelerometers and gyroscopes oriented along three axes. The raw signals from the accelerometers and gyroscopes are used to derive a second position indication and a second velocity value. A Kalman filter function is applied to the first and second position indications and to the first and second velocity indications to thereby produce a present position indication and a present velocity indication. The Kalman filter function exploits GPS data to corrects periodic drift in the position and velocity indications derived form the accelerometers and gyroscopes by calculating accelerometer and gyroscope biases, thereby enabling relatively inexpensive devices to be utilized.

18 Claims, 2 Drawing Sheets

U.S. PATENT DOCUMENTS

| | | | |
|---|---|---|---|
| 2008/0234933 A1* | 9/2008 | Chowdhary et al. | 701/213 |
| 2008/0269988 A1* | 10/2008 | Feller et al. | 701/41 |
| 2009/0091351 A1* | 4/2009 | Bueti et al. | 326/101 |
| 2009/0099774 A1* | 4/2009 | Takac et al. | 701/216 |
| 2009/0115656 A1* | 5/2009 | Raman et al. | 342/357.03 |
| 2009/0326851 A1* | 12/2009 | Tanenhaus | 702/96 |
| 2010/0106416 A1* | 4/2010 | Yochum | 701/213 |
| 2011/0202204 A1* | 8/2011 | Kahn | 701/3 |

OTHER PUBLICATIONS

Gebre-Egziabher, D., et al., A Low-Cost GPS/Inertial Attitude Heading Reference System (AHRS) for General Aviation Applications, IEEE Position Location and Navigation Symposium, Apr. 20-23, 1998.

* cited by examiner

AIRCRAFT NAVIGATION USING THE GLOBAL POSITIONING SYSTEM AND AN ATTITUDE AND HEADING REFERENCE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to navigation and position determining systems, and more particularly to navigation utilizing data from the global positioning system and an attitude and heading reference system.

2. Description of the Related Art

Aircraft have traditionally used an inertial reference system (IRS) with motion sensors connected to a processor that continuously tracked the position and velocity (direction and speed) of the aircraft without using external references. The inertial reference system was initialized on the ground by the flight crew entering the known position coordinates of the aircraft, such as the longitude, latitude, and altitude of the airport at which the aircraft is parked. As the aircraft moved thereafter, the inertial reference system updated the position and velocity by integrating information received from the motion sensors on the aircraft. The motion sensors usually included three accelerometers that measured linear acceleration along three orthogonal axes, and a trio of gyroscopes that measured angular velocity along the three axes. The aircraft velocity and change in position was derived from the accelerometer and gyroscope signals. The change in position along with a previously determined position are employed to derive a new position for the aircraft.

Even though the typical inertial reference system employed relatively expensive and sophisticated accelerometers and gyroscopes, it suffered from integration drift. Integration drift is small errors in the measurement of acceleration and angular velocity that become integrated into progressively larger aircraft velocity and position errors. Thus, over the course of a trip, the inertial reference system's indication of position will deviate from that actual position of the aircraft.

Because of that drift, some present day inertial reference systems are corrected by data from the global positioning system (GPS). The GPS uses a constellation of earth orbiting satellites that continuously transmit messages via microwave signals containing the time at which the message was sent and ephemeris data regarding the precise orbit for the satellite. A GPS receiver onboard the aircraft uses the arrival time of each message, the time it was sent, and the propagation rate of the microwave signal, to calculate the separation distance between the aircraft and the satellite. The position of the satellite is determined from its ephemeris data. This information tells the GPS receiver that the aircraft is located on an imaginary spherical surface centered at the satellite and having a radius equal to the separation distance. Using similar data from a second satellite, the GPS receiver determines that the aircraft also is located on a second imaginary spherical surface and more specifically on the circular intersection of the two spherical surfaces. The spherical surface related to a third satellite intersects the circle at two points, only one of which often is a possible position for the aircraft as the other point may be too far from the earth. Nevertheless, the data from a fourth satellite eliminates one of those two points, confirming the precise position of the aircraft. The three dimension GPS position then was used to correct the drift error of the inertial reference system.

However, if GPS signals from a sufficient number of satellites were not received, the inertial reference system drift error no longed could be dynamically corrected. For example, atmospherical and astronomical conditions adversely affect the accuracy of the GPS and other factors adversely affect GPS signal reception. If the GPS information is lost, the accuracy of the inertial reference system degraded over time.

Aircraft also have employed an attitude and heading reference system (AHRS) that as the name implies provided information regarding the aircraft's attitude (i.e., pitch and roll) and the aircraft's heading. This system also sensed acceleration along three orthogonal axes, and angular velocity along the three axes, however it did not determine the position and velocity of the aircraft.

Whereas inertial reference systems utilized relatively expensive and thus accurate accelerometers and gyroscopes, the attitude and heading reference systems employed very inexpensive as less accurate versions of those types of devices. For example, an AHRS may use small micro electromechanical systems (MEMS) type accelerometers, consisting of little more than a cantilever beam with a proof mass. Available units comprise MEMS accelerometers mounted orthogonally to each other in a common package for three axis acceleration sensing.

SUMMARY OF THE INVENTION

A navigation system for a vehicle comprises an attitude and heading reference system that includes a plurality of accelerometers and a plurality of gyroscopes attached to the vehicle. The accelerometers and gyroscopes produce signals indicating motion of the vehicle. A receiver, onboard the vehicle, receives first signals of a global positioning system and produces a first position indication.

A navigation processor receives the accelerometers and gyroscopes signals from the attitude and heading reference system and in response to those signals produces a second position indication. The processor also receives the first position indication, wherein the processor employs the first and second position indications to produce a present position indication for the vehicle.

In one embodiment of the navigation system, the processor uses a recursive data processing algorithm, such as a Kalman filter function to produce a present position indication from the first and second position indications.

Another aspect of the navigation system involves the receiver also producing a first velocity indication and the processor also produces a second velocity indication using the data from the plurality of accelerometers and the plurality of gyroscopes. Then the processor employs the first and second velocity indications to produce a present velocity indication for the vehicle.

DETAILED DESCRIPTION OF THE INVENTION

Figure 1:
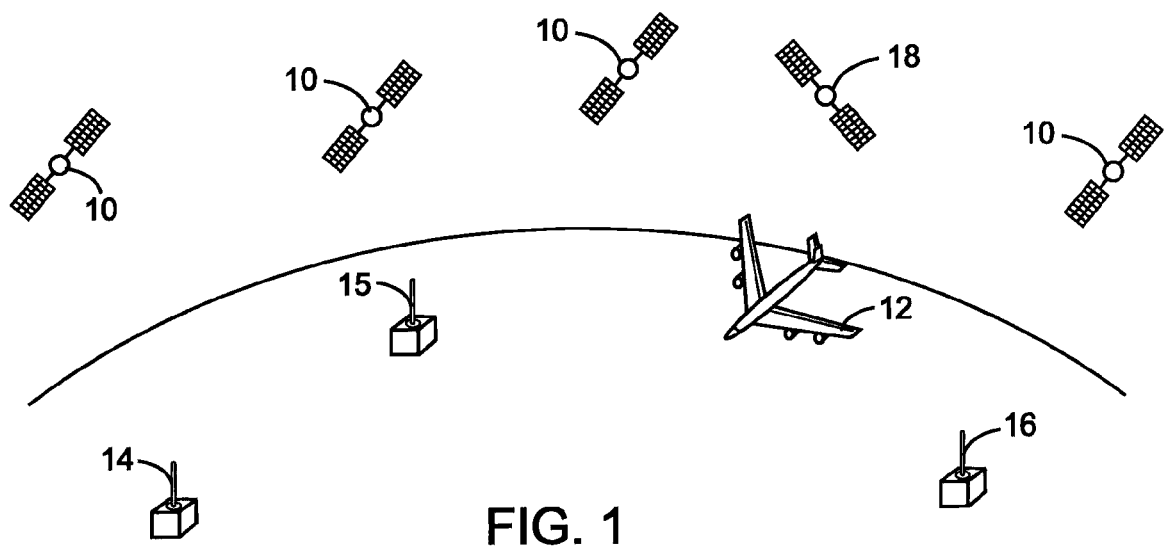
FIG. 1 is a diagrammatic depiction of an operational scenario for an aircraft.

Referring initially to FIG. 1, the conventional global positioning system (GPS) comprises a plurality of satellites 10, each broadcasting a unique microwave signal. Those GPS signals from the satellites 10 can be used to determine the position of a vehicle, such as the aircraft 12. The orbits of the GPS satellites 10 are arranged in multiple planes, in order to maximize the likelihood that the aircraft 12 simultaneously receives signals from at least four GPS satellites at any arbitrary point on or near the earth. The orbits of the GPS satellites 10 are determined with accuracy from fixed ground stations and are relayed back to the respective satellite.

In navigation applications of the GPS, the latitude, longitude, and altitude of any point close to the earth, such as that of the aircraft 12, can be calculated from the propagation times of the signals from four or more of the satellites 10 to the unknown position. A measured range, often called the "pseudorange", between the GPS receiver at the unknown position and the four satellites within view is determined based on those propagation times. The measured range is referred to as pseudorange because there is generally a time difference or offset between timing clocks on the satellites and a timing clock within the GPS receiver. Thus, for three-dimensional position determination at least four satellite signals are typically needed to solve for four unknowns, i.e., the time-offset together with the three-dimensional position. The present navigation technique employs the global positioning system in a conventional manner to provide one determination of the position and velocity of the aircraft 12.

Accuracy of the GPS navigation has been improved by the Wide Area Augmentation System (WAAS) that provides precision guidance to aircraft at thousands of airports and airstrips where there is currently no precision landing capability. WAAS also ensures the integrity of information coming from GPS satellites and comprises a plurality of reference ground stations 14, 15 and 16 which geographically cover nearly all the airspace of the United States of America. Each reference ground station has a receiver that monitors the signals from the GPS satellites and from those signals determines the position of the respective station. The station's position has been accurately determined by precise surveying which is compared to the GPS derived position, thereby enabling errors in the received GPS signals to be detected. The GPS information collected by the reference ground station stations is forwarded to a WAAS master station via a terrestrial communication network. In response, the master station produces WAAS augmentation messages which contain information regarding GPS signal errors. Geostationary communication satellites 18 relay the WAAS augmentation messages to aircraft, thereby enabling GPS/WAAS receivers on board aircraft to compensate for the errors in the GPS signals. Employing the WAAS information to compensate for GPS signal errors provides significantly increased accuracy and reliability in determining the aircraft position.

Figure 2:
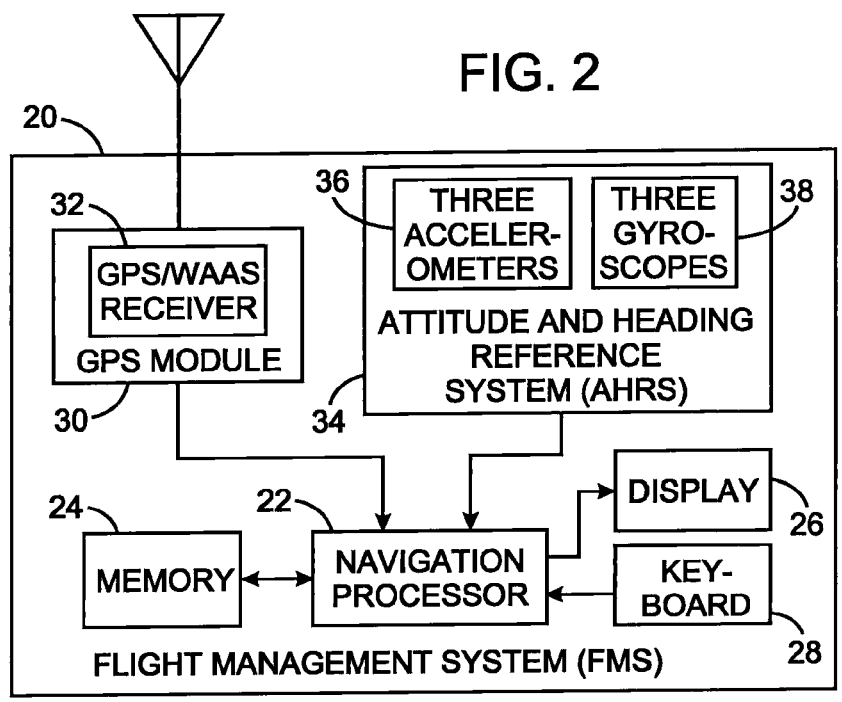
FIG. 2 is a schematic diagram of an onboard flight management system which incorporates the present invention.

Referring to FIG. 2, the flight management system 20 onboard the aircraft 12 incorporates components of a navigation system that has computerized avionics similar to those found on most commercial and business aircraft to assist pilots in navigation, flight planning, and aircraft control functions. The FMS 20 includes a navigation processor 22 that integrates the functions of navigation and aircraft performance management. The navigation processor 22 is coupled to a memory 24 contains a database of navigation data for airports, approach and departure procedures, airways, holding patterns and other information. A display 26 and keyboard 28 provide enable the flight crew to interface with the FMS 20.

The present flight management system 20 receives information derived from the GPS satellites 10 and the WAAS satellites 18. A GPS module 30 is provided for those purposes. That module includes a conventional GPS/WAAS receiver 32 for signals from both GPS and WAAS satellites. The GPS module 30 uses the signals processed by that receiver 32 to determine the position and velocity of the aircraft in a conventional manner. The GPS derived position and velocity information are provided to the navigation processor 22.

The FMS 20 also incorporates an attitude and heading reference system (AHRS) 34 which employs signals from three accelerometers 36 that measure acceleration along three axes of the aircraft and three gyroscopes 38 which measure angular motion relative to a reference plane. The AHRS 34 utilizes the data from the accelerometers 36 and gyroscopes 38 to determine the attitude and heading of the aircraft 12. That attitude and heading is conveyed to the navigation processor 22 in a conventional manner. Uniquely the AHRS 34 also sends the raw signal data produced by the accelerometers 36 and gyroscopes 38 to the navigation processor in order for that data to used to update the AHRS position and velocity. Alternatively the AHRS capability internal to FMS 20 can be replaced by an external AHRS.

Figure 3:
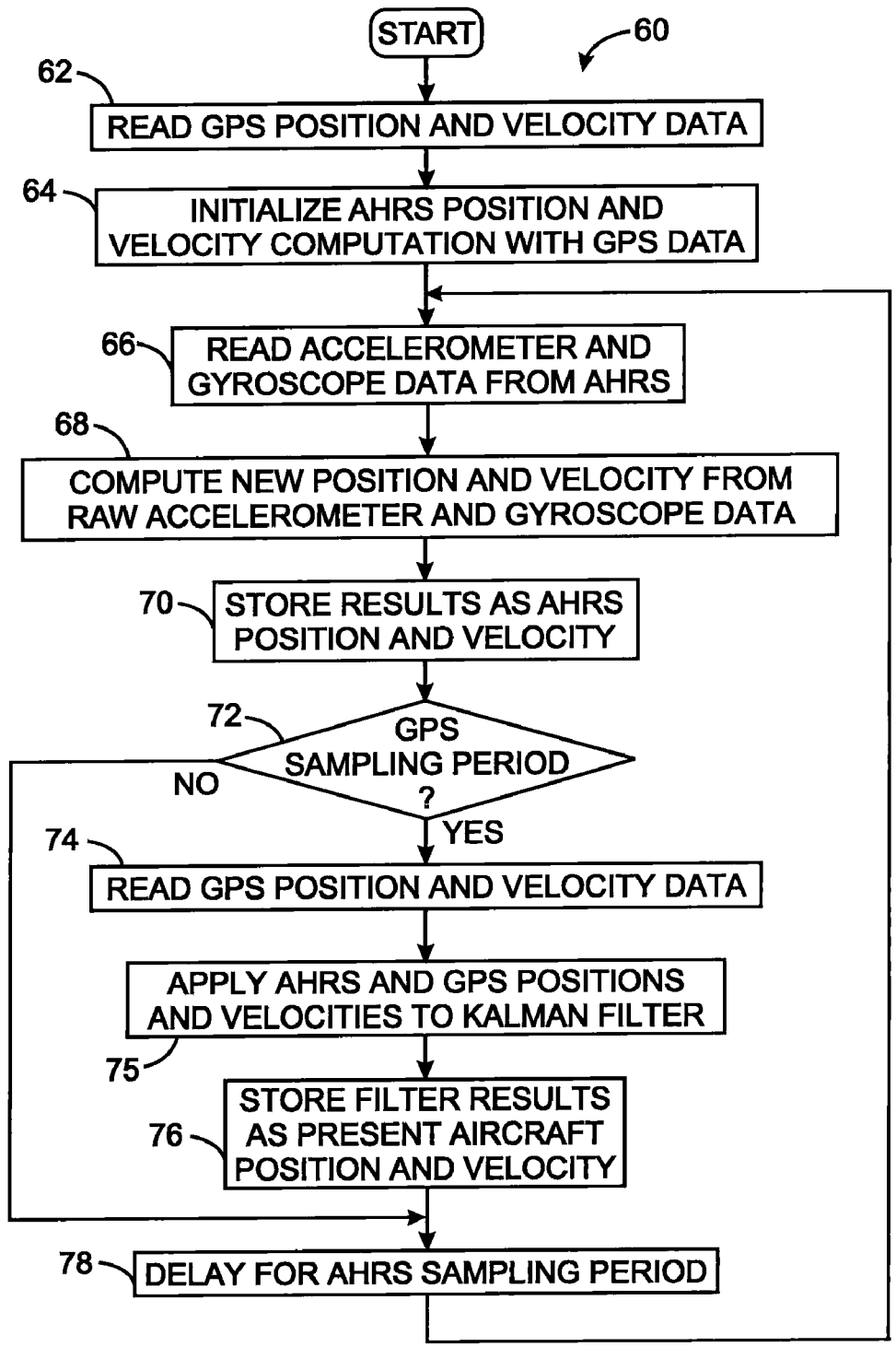
FIG. 3 is a flowchart of a software routine for determining the position and velocity of the aircraft using global positioning system signals and data from an attitude and heading reference system.

FIG. 3 is a flow chart of a software routine 60 which is executed by the navigation processor 22 of the FMS 20 and which utilizes the raw gyroscopic and accelerometer data from the AHRS 34 along with the GPS data to produce an enhanced determination of the position and velocity of the aircraft 12. The present navigational method requires initialization typically occurs when the aircraft is first powered up either at the beginning of a new flight day or after having been in a powered down during a long period between flights. The initialization commences at step 62 where the GPS position and velocity as determined by the GPS module 30 are read by the navigation processor 22. The GPS position may be indicated in the World Geodetic System of 1984 (WGS-84) coordinate system, which is an earth-centered, earth-fixed reference frame, however another coordinate system may be used. The WGS-84 position and velocity are each depicted as a set of three Cartesian coordinate values in which the aircraft position is designated by $GPS_{px}$, $GPS_{py}$ and $GPS_{pz}$, and the aircraft velocity value by $GPS_{vx}$, $GPS_{vy}$, and $GPS_{vz}$.

That position and velocity data then are employed at step 64 to initialize the parallel calculation of position and velocity data based on the information from the AHRS 34. Thus, the AHRS calibration is initially set to the identical position and velocity data as derived from the GPS module 30. Both of the AHRS position and velocity also are represented as three Cartesian coordinate system values, thus $AHRS_{px}$, $AHRS_{py}$ and $AHRS_{pz}$ denote the aircraft position and $AHRS_{vx}$, $AHRS_{vy}$, and $AHRS_{vz}$ denote the aircraft velocity.

The software routine 60 then enters its main processing loop which is executed repeatedly while the flight management system remains powered. This loop is entered at step 66 where the navigation processor 22 receives the raw accelerometer and gyroscope data from the AHRS 34. At step 68, the navigation processor 22 then employs a conventional method, such as a standard inertial strapdown navigation algorithm, to update the position and velocity of the aircraft. Specifically, the raw accelerometer and gyroscope data are employed to determine the change in aircraft position which occurred since the last time step 68 was executed. The sensor accelerometer and gyroscope data from the AHRS then is used by the navigation algorithm to update the previously determined AHRS position and velocity of the aircraft. At step 70, the new position and velocity indications are stored as the AHRS position and velocity data in the memory 24.

Then at step 72, a determination is made whether to read the GPS position and velocity again. For example data from the GPS module 30 is read at a frequency of approximately once a second of time. Thus if a second has not elapsed since the last reading of this data, as determined by a software timer executed by the navigation processor 22, the execution branches to step 78 to wait until it again is time to sample the accelerometer and gyroscope data from the AHRS 34.

Otherwise, if at step 72 it is time to sample the GPS data again, the execution branches to step 74 where the GPS position and velocity data are read from the GPS module 30 and stored temporarily in memory 24.

Next the software routine 60 applies a Kalman filter function to the AHRS and GPS positions and velocities at step 75. The Kalman filter function is an efficient recursive data processing algorithm that estimates the state of a dynamic system from a series of measurements, each of which may, at least from time to time, have some degree of inaccuracy or uncertainty. The Kalman filter combines the position and velocity measurements produced from the GPS and AHRS information plus prior knowledge about the aircraft dynamics, to produce an estimate of the aircraft position and velocity in a manner that statistically minimizes uncertainty present in the input data. Kalman filter will also estimates biases in the accelerometers 36 and gyroscopes 38 which affects the accuracy of the signals produces by those devices. The bias estimates from the Kalman filter can be stored and used at step 68 during a subsequent loop through the software routine 60 to compensate the raw accelerometer and gyroscope data for those bias errors before computing the position and velocity.

In the Kalman filter, dynamics of the system are modeled mathematically using either a continuous-time or discrete update equation. The discrete state equation has the form:

$$x(k+1)=A*x(k)+B*u(k)+w(k)$$

Where:
x(k) is the state vector (truth) at time k,
A is the state transition matrix (STM),
B is the control matrix,
u(k) is the control vector at time k, and
w(k) is the process noise vector affecting accuracy at time k.

This equation provides the prediction aspect of the Kalman filter. Next, sensors make either direct or indirect measurements of the states. The relationship between the state vector and the measurements is given by:

$$Z(k)=H*x(k)+v(k)$$

Where:
Z(k) is the measurement vector at time k,
H is the measurement connection matrix, and
v(k) is the measurement noise vector at time k.

Kalman filtering assumes that process and measurement noise is normally distributed white noise that can be expressed as:

$$p(w) = N(O,Q)$$

$$p(v) = N(0,R)$$

where p(w) is the probability of vector w, and N(0, Q) is a normally-distributed random number vector with zero mean and covariance matrix Q. The Kalman filter is implemented with non-white process and measurement noise by adding extra states.

Finally, each state is statistically related to the other states through the covariance matrix P. The matrix P is defined by:

$$\hat{x}(k)=E[x(k)]$$

$$P(k)=E[(x(k)-\hat{x}(k))*(x(k)-\hat{x}(k))^T]$$

Where:
$\hat{x}(k)$ is the estimated state vector at time k,
E[ ] is the expected value function, and
P(k) is the state covariance matrix.

The state corrector uses measurement data to drive the state estimate ($\hat{x}(k)$) towards the actual state value (x(k)). Rudolf E. Kalman proved that the following set of equations guarantee asymptotic convergence of the state estimate to the actual state while minimizing the state covariance matrix.

Estimation Step:

$$\hat{x}^-(k+1)=A*\hat{x}(k)+B*u(k)$$

$$P^-(k+1)=A*P(k)*A^T+Q$$

Correction Step:

$$K=P^-(k+1)*(H*P^-(k+1)*H^T+R)^{-1}$$

$$\hat{x}(k+1)=\hat{x}^-(k+1)+K*(Z(k)-H*\hat{x}^-(k+1))$$

$$P(k+1)=(I-K*H)*P^-(k+1)$$

Where:
$\hat{x}^-$ is the uncorrected state estimate,
$P^-$ is the uncorrected state covariance matrix,
K is the Kalman gain matrix, and
I is the identity matrix.

A flat-earth Cartesian coordinate system is used. Internally the Kalman filter function produces an approximation of the velocity from the change in position indicated by successive AHRS position indications.

The Kalman filter then produces a combined position approximation and a velocity approximation which at step 76 are stored in the memory 24 as the present position and velocity of the aircraft that will be used thereafter for navigation purposes. Then at step 77 the AHRS position and velocity data are corrected using results of the Kalman filter function. Thus the next time that step 68 is executed to derive a new AHRS position and velocity from the raw accelerometer and gyroscope data, that derivation will be based on the corrected AHRS position and velocity data.

The Kalman filter also calculates accelerometer and gyroscope drift or bias that are used to compensate for sensor drift. The next time that step 68 is executed, the accelerometer and gyroscope drift data are used to correct the raw accelerometer and gyroscope data for that drift bias and thereby produce more accurate AHRS position and velocity indications.

The AHRS position and velocity are updated more frequently, such as once every millisecond for example, than the GPS data. Therefore, a delay occurs at step 78 it again is time to derive another set of AHRS position and velocity values. At that time, the program execution returns to step 68 to again acquire the raw data from the accelerometers and the gyroscopes.

The present invention derives position indications from the GPS module 30 and the AHRS accelerometer and the gyroscope data. The Kalman filter exploits the dynamics of the aircraft which govern its time evolution, to remove the effects of system uncertainty from that pair of position indications and provides optimal estimates of the present aircraft position and velocity. The basic position and velocity indications from the AHRS 34 are adjusted based on the position indication from the GPS module 30.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A navigation system for a vehicle comprising:
   a plurality of accelerometers onboard the vehicle;
   a plurality of gyroscopes onboard the vehicle;
   a receiver, onboard the vehicle, for first signals of a global positioning system and in response thereto producing, repeatedly at a first frequency, a first position indication for the vehicle; and
   a processor that receives data from the plurality of accelerometers and the plurality of gyroscopes and therefrom produces a second position indication for the vehicle, and also receives the first position indication, wherein the processor applies a recursive data processing algorithm to the first and second position indications to produce a present position indication for the vehicle.

2. The navigation system as recited in claim 1 wherein the processor applies a Kalman filter function to the first and second position indications.

3. The navigation method as recited in claim 2 wherein the Kalman filter function produces bias data indicating errors in the data provided by the plurality of accelerometers and the plurality of gyroscopes; and further comprising employing the bias data to compensate the data provided by the plurality of accelerometers to derive the present position indication.

4. The navigation system as recited in claim 1 wherein the receiver also receives second signals of a Wide Area Augmentation System and wherein the first position indication also is produced in response to the second signals.

5. The navigation system as recited in claim 1 wherein:
   the receiver also produces a first velocity indication; and
   the processor also produces a second velocity indication using the data from the plurality of accelerometers and the plurality of gyroscopes, and employs the first and second velocity indications to produce a present velocity indication for the vehicle.

6. The navigation system as recited in claim 5 wherein the processor applies the recursive data processing algorithm to the first and second velocity indications to produce the present velocity indication.

7. The navigation system as recited in claim 5 wherein the processor applies a Kalman filter to the first and second position indications and to the first and second velocity indications to produce the present position indication and the present velocity indication.

8. A navigation method for a vehicle comprising:
   receiving, via a receiver onboard the vehicle, signals of a global positioning system and in response thereto producing, repeatedly at a first frequency, a first position indication for the vehicle;
   receiving data from a plurality of accelerometers attached to the vehicle;
   receiving data from a plurality of gyroscopes attached to the vehicle;
   deriving a second position indication for the vehicle from the data provided by the plurality of accelerometers and the plurality of gyroscopes, wherein the second position indication is derived repeatedly at a second frequency that is greater than the first frequency; and
   employing the first and second position indications to produce a present position indication for the vehicle.

9. The navigation method as recited in claim 8 wherein deriving a second position indication employs an inertial strapdown navigation algorithm.

10. The navigation method as recited in claim 8 wherein the present position indication for the vehicle is produced by applying a recursive data processing algorithm to the first and second position indications.

11. The navigation method as recited in claim 8 wherein the present position indication for the vehicle is produced by applying a Kalman filter function to the first and second position indications.

12. The navigation method as recited in claim 11 wherein the Kalman filter function produces bias data indicating errors in the data provided by the plurality of accelerometers and the plurality of gyroscopes; and further comprising employing the bias data to compensate the data provided by the plurality of accelerometers and the plurality of gyroscopes, and then using such compensated data in deriving the present position indication.

13. The navigation method as recited in claim 8 further comprising:
    deriving a first velocity indication from the signals of the global positioning system;
    deriving a second velocity indication from data provided by the plurality of accelerometers and the plurality of gyroscopes; and
    employing the first and second velocity indications to produce a present velocity indication for the vehicle.

14. The navigation method as recited in claim 13 wherein the present position indication and the present velocity indication are produced by applying a recursive data processing algorithm to the first and second position indications and to the first and second velocity indications.

15. The navigation method as recited in claim 13 wherein the present position indication and the present velocity indication are produced by applying a Kalman filter function to the first and second position indications and to the first and second velocity indications.

16. A navigation method for a vehicle comprising:
    receiving, onboard the vehicle, signals of a global positioning system and in response thereto producing, repeatedly at a first frequency, a first position indication for the vehicle and a first velocity indication for the vehicle;
    receiving data from a plurality of accelerometers attached to the vehicle and from a plurality of gyroscopes attached to the vehicle;
    deriving a second position indication for the vehicle from the data received from the plurality of accelerometers and the plurality of gyroscopes;
    deriving a second velocity indication for the vehicle from the data received from the plurality of accelerometers and the plurality of gyroscopes, wherein the second position indication and the second velocity indication are produced repeatedly at a first frequency; and
    applying a Kalman filter function to the first and second position indications and to the first and second velocity indications to thereby produce a present position indication and a present velocity indication at a second frequency, wherein the first frequency is greater than the second frequency.

17. The navigation method as recited in claim 16 wherein deriving a second position indication and deriving a second velocity indication employs a inertial strapdown navigation algorithm.

18. The navigation method as recited in claim 16 wherein the Kalman filter function produces bias data indicating errors in the data provided by the plurality of accelerometers and the plurality of gyroscopes; and further comprising employing the bias data to compensate the data provided by the plurality of accelerometers to derive the present position indication and the present velocity indication.

\* \* \* \* \*